Nov. 16, 1965 R. P. KIRKUP 3,218,023
PROPORTIONAL FLOW METERING VALVE
Filed July 2, 1962
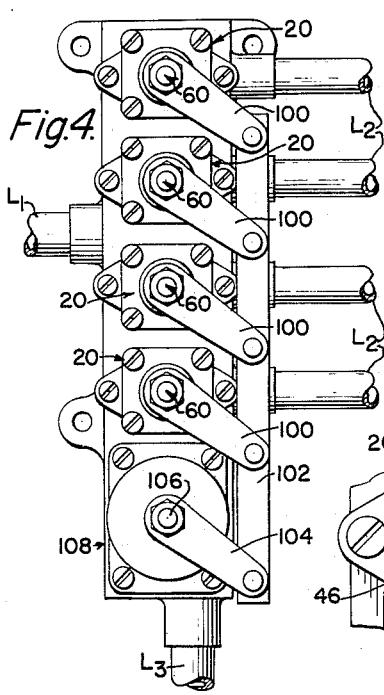
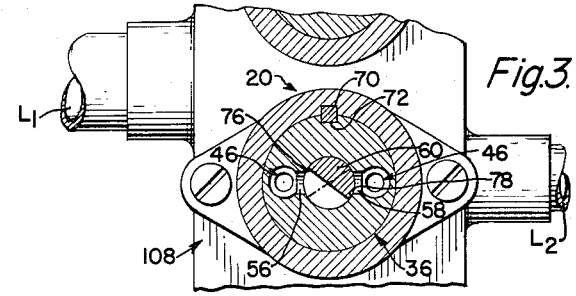
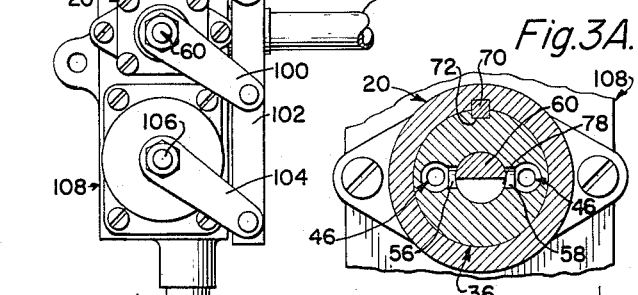
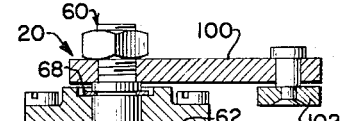
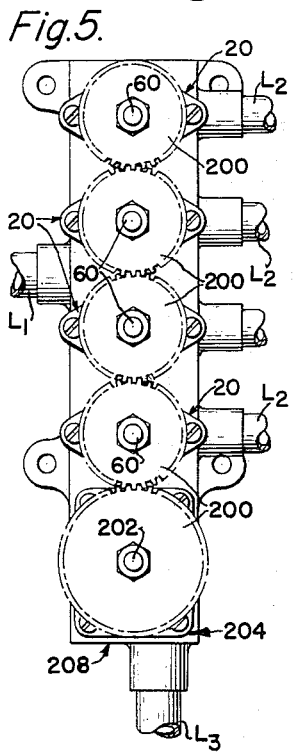
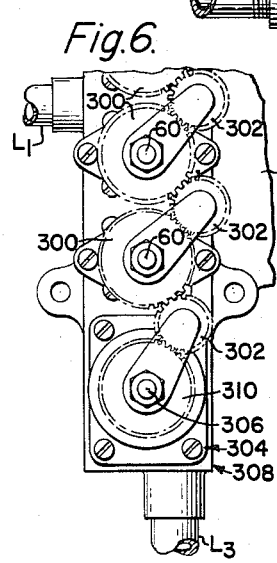
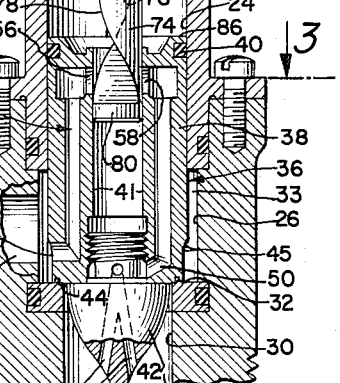
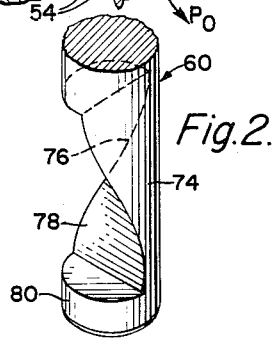
INVENTOR:
RICHARD P. KIRKUP,
BY
Attorney.

United States Patent Office 3,218,023
Patented Nov. 16, 1965

3,218,023
PROPORTIONAL FLOW METERING VALVE
Richard P. Kirkup, Palos Verdes Estates, Calif., assignor to The Garrett Corporation, Los Angeles, Calif., a corporation of California
Filed July 2, 1962, Ser. No. 206,729
15 Claims. (Cl. 251—38)

This invention relates generally to servomechanisms and particularly to an improved and simplified fluid pressure operated positional servomechanism. The invention relates also to a fluid metering valve embodying the servo and to multiple servo and valve systems in which a group of the present servos or valves are synchronously controlled from a common actuator.

Briefly, the present servo comprises a movable output member or piston which is displaced and positioned in accordance with the input displacement of an input element or pilot. In the present illustrative embodiment of the invention, the input displacement of the pilot is rotational and the movement of the output member is linear so that the linear position of the output member is a function of the angular position of the pilot.

A highly important and unique feature of the invention resides in certain novel configurations of, and coacting functional relationships between, the pilot and various other elements of the servo which effect a feedback action internally of the unit for accurately displacing and positioning the output member as a function of the input displacement of the pilot.

It will become evident as the description proceeds that the present servo unit and servo system are capable of a wide variety of uses and applications. For the sake of illustration, one typical use of the servo unit is disclosed herein, namely, positioning the obturator of a seating-type, pilot operated fluid metering valve with respect to its valve seat. In this particular application, the input element or pilot of the servo unit serves as the valve pilot. There also are disclosed systems comprising a group of the present fluid metering valves with means for synchronously controlling the pilots of the several valves from a single common actuator to obtain simultaneous operation of the valves in any desired sequence or phase relationship.

A general object of the present invention is, then, to provide a new and improved fluid pressure operated positional servo unit and a fluid metering valve embodying the servo.

A more specific object of the invention is to provide a servo unit and a pilot-operated fluid metering valve embodying the same having a unique internal feedback action for accurately positioning the servo output member, or valve abturator, as function of the input displacement of the servo or valve pilot.

A further object of the invention is to provide unique multiple unit servo and valve systems in which a group of the present servo units, or metering valves, are synchronously controlled from a single common actuator.

Yet a further object of the invention is to provide a servo unit, a fluid metering valve, and multiple unit servo and valve systems embodying the same which are relatively simple in construction, reliable, economical to manufacture, and otherwise ideally suited to their intended purposes.

Briefly, the objects of the invention are obtained by providing a servomechanism equipped with a pilot member and a second member having confronting surfaces with means for effecting relative movement of these members in one direction along a directional line parallel to the surfaces by the force of fluid pressure in a pressure chamber. The members are urged in the opposite direction of relative movement thereof by an opposing force. Extending through one of the members is a fluid passage communicating a fluid inlet to a fluid outlet through fluid metering ports in one of said surfaces and communicating with the pressure chamber between these ports. The relative effective area of the ports is regulated by the other surface in response to relative movement of the members and in such manner that the chamber pressure is increased as the members undergo relative movement in said one direction and decreased as the members undergo relative movement in the opposite direction. Thus, the members assume an equilibrium position wherein the forces are balanced.

The pilot member is adjustable to regulate the ports independently of the relative movement of the members by said forces and in such manner as to cause relative movement of the members along the above-mentioned direction line under the action of said forces to a new position of equilibrium.

In the illustrative embodiments of the invention, the pilot member is slidably received in a bore in a second member and these members undergo relative movement in the axial direction of the bore. The fluid metering ports are in the sidewall of this bore and the pilot has longitudinally extending, helically curved sealing edges which progressively cover one port and uncover the other port as the members move axially with respect to one another. The input motion of the pilot member is rotational about the axis of the bore.

In the present fluid metering valve, the pressure wall of the servo carries a valve obturator. This obturator is engageable with a valve seat about a fluid passage through the valve body by movement of the obturator under the force of fluid pressure in the pressure chamber of the valve servomechanism. In the illustrated multiple servo and valve system, the pilots of the several servos or valves are ganged in certain unique ways for simultaneous actuation of the pilots in any desired phase relation or sequence.

A better understanding of the invention may be had from the following detailed description of certain presently preferred embodiments thereof taken in connection with the attached drawings wherein:

FIG. 1 is a longitudinal section through a presently preferred form of the present fluid metering valve;
FIG. 2 is an enlarged perspective of a portion of the valve pilot;
FIG. 3 is a section taken on line 3—3 in FIG. 1;
FIG. 3A is a view similar to FIG. 3 showing the valve pilot in its neutral position;
FIG. 4 illustrates a multiple valve system according to the invention;
FIG. 5 illustrates a modified multiple valve system according to the invention; and
FIG. 6 illustrates yet a further modified multiple valve system according to the invention.

The fluid metering valve 20 illustrated in FIGS. 1–3A of these drawings comprises a body 22. Within this valve body in a cylinder 24. Cylinder 24 opens at its lower end to an enlarged fluid chamber 26. Communicating with fluid chamber 26 is an inlet 28 on the valve body which is adapted for connection to a source, not shown, of fluid under pressure.

Extending through the lower end of the valve body 22, on the axis of the cylinder 24, is a bore 30 which forms the valve outlet. About the intersection of this bore with the lower wall of the fluid chamber 26 is an annular valve seat 32. Valve inlet 28, fluid chamber 26, and valve outlet 30 form a primary fluid passage 33 through the valve body. The valve seat 32 extends about and faces in the upstream direction of this fluid passage.

In actual operation of the valve, the inlet 28 is preferably supplied with a constant high pressure $P_I$ and the outlet 30 is exposed to lower back pressure $P_O$ which is later considered to be negligible. The valve body has threaded or other suitable outlet and inlet connections 34 and 35 respectively, for connection of the valve in a fluid pressure system.

Within the valve body 22 is a valve obturator 36. The upper portion or body 38 of this obturator is cylindrical and proportioned to have a close sliding fit in the cylinder 24. An O-ring 40 provides a sliding fluid seal between the valve body 22 and the obturator body 38. Threaded in and closing the lower end of an axial bore 41 through the obturator 36 is a tapered metering pintle 42 which projects into the valve outlet 30. At the lower end of the obturator body is an annular shoulder 44. This shoulder provides a valve face on the obturator which is engageable with the valve seat 32 on the valve body, to close the valve outlet 30, when the obturator occupies its closed position of FIG. 1. The obturator also has a lower transverse shoulder or pressure face 45 exposed to the inlet fluid pressure in chamber 26.

Extending through the obturator 36 is a secondary fluid passage 46. One end 48 of this passage opens to the valve inlet 28. The other end 50 of the passage communicates with smaller bores 54 which open through the lower end of the metering pintle 42 to the valve outlet 30. Obturator bore 41 intersects the secondary fluid passage 46 at the upper end of the obturator. The latter passage opens to the bore 41 through diametrically opposed ports or orifices 56 and 58 in the wall of the bore.

Slidably and rotatably fitted in the obturator bore 41 is a valve pilot 60. This pilot extends through the upper end wall 62 of the valve body 22. Fixed on the pilot above and below the end wall 62 are snap rings 68 which restrain the pilot against axial movement but permit rotation of the pilot. The valve obturator 36 is restrained against rotation with the pilot by a key 70 on the valve body engaging in a longitudinal keyway 72 in the obturator.

Pilot 60 has a cylindrical sealing surface 74 disposed in fluid sealing relation to the wall of the obturator bore 41. This pilot sealing surface terminates in two longitudinally extending, circumferentially inclined edges 76 and 78. These edges have been illustrated as being helically curved and defined by the intersection of a helical surface on the pilot with the pilot sealing surface 74. The lower end 80 of the pilot is cylindrical and has a sliding fit in the obturator bore 41.

It is evident from an inspection of the drawing that one of the ports or orifices 56 or 58 in the secondary fluid passage 46 is progressively covered or closed and the other port or orifice is progressively uncovered or opened by the sealing surface 74 on the pilot 60 during either rotation of the pilot with respect to the ports or displacement of the ports with respect to the pilot in the axial direction of the latter. This axial displacement of the ports with respect to the pilot is produced, of course, by axial movement of the obturator 36 in its cylinder 24. It will be further observed that the pilot 60 and the fluid ports or orifices 56, 58 may be relatively positioned so that equal areas of the ports are uncovered by the pilot. This relative position of the pilot and ports is hereinafter referred to as the neutral position and is illustrated in FIG. 3A.

Let us assume now that the valve obturator 36 occupies the closed position of FIG. 1 wherein its valve face 44 engages the valve seat 32 to close the primary fluid passage 33 through the valve. Let us assume further that the valve pilot 60 is turned to its solid line angular position of FIG. 3 wherein the upstream port or orifice 56 is completely uncovered by the pilot and the downstream port or orifice 58 is completely covered by the pilot. It is evident that under these conditions, pressure fluid will flow from the valve inlet 28, through the secondary fluid passage 46 of the valve and the upstream orifice 56 into the cylinder space or fluid chamber 84 at the upper end of the obturator until the pressure in this chamber equals the inlet pressure $P_I$. This fluid pressure acting on the effective area of the upper transverse pressure face 86 of the obturator creates a downward force on the obturator tending to retain its valve face 44 in contact with the valve seat 32. The inlet pressure $P_I$ acting on the effective area of the lower pressure face 45 on the obturator and the outlet pressure $P_O$ acting on the effective area of the obturator exposed to the latter pressure creates an upward force on the obturator tending to move the latter upwardly out of contact with the valve seat 32.

Now it will be observed that the obturator 36 is, in effect, a differential piston whose upper pressure face 86 has a greater effective area than its lower pressure face 45. Since in the solid line pilot position of FIG. 3, both of these pressure faces are exposed to the same pressure, i.e., the inlet pressure $P_I$, it is obvious that the resultant force on the obturator, due to action of the inlet pressure on these two pressure faces is downward in the direction of the valve seat 32. This resultant force, of course, is diminished by the upward force of the outlet pressure $P_O$ on the effective area of the obturator exposed to the latter pressure. If the outlet pressure $P_O$ is assumed to be substantially lower than the inlet pressure $P_I$, as it will ordinarily be, the total net resultant force on the obturator is in the downward direction so that the obturator is held in contact with the valve seat 32. For ease of explanation, the outlet pressure is assumed to be negligible in the following discussion of the valve operation and, therefore, the upward force created by this pressure is ignored. It will become obvious, however, that if the outlet pressure $P_O$ is significant, it may be compensated for the appropriate proportioning of the obturator.

Assume now that the pilot 60 is rotated from its solid line position of FIG. 3 to the neutral position of FIG. 3A wherein equal areas of the ports or orifices 56, 58 are uncovered. Fluid flow now occurs from the valve inlet 28, through both orifices 56, 58 to the valve outlet 30. The fluid pressure in the upper fluid chamber 84 drops while the inlet pressure $P_I$ acting on the lower obturator pressure face 45 remains unchanged. The upstream orifice 56 is so proportioned that in the pilot position under consideration, the pressure drop through the latter orifice creates a fluid pressure in the upper fluid chamber 84 which produces a downward force on the valve obturator 36 equal to the upward force produced by the action of the inlet pressure $P_I$ on the pressure face 45 of the obturator. The then partially exposed downstream orifice 58 further drops the pressure of the fluid flowing through the secondary fluid passage end 50 to substantially the level of the outlet pressure $P_O$. In the pilot position of FIG. 3A, then, the valve remains closed so that still no fluid flow occurs through the primary fluid passage 33 of the valve. Fluid leakage does occur through the secondary passage 46, however, as just explained.

Let us assume now that the valve pilot 60 is rotated beyond the position of FIG. 3A to the dotted line position of FIG. 3, for example, wherein the upstream orifice 56 is completely covered and the downstream orifice 58 is completely uncovered by the pilot. Under these conditions, the upper fluid chamber 84 is vented to the low pressure in the valve outlet 30. The high inlet pressure $P_I$ acting on the lower obturator pressure face 45 now creates a net resultant upward force on the obturator 36. Accordingly, the obturator moves upwardly, thereby unseating the valve face 44 from the valve seat 32 so that fluid flow occurs from the valve inlet 28, between the valve seat 32 and valve face 44, to the valve outlet 30.

It is evident that as the obturator moves upwardly, the upstream port or orifice 56 is gradually uncovered and the downstream orifice 58 is gradually recovered by the pilot 60 because of the helical curvature of the sealing surface edges 76, 78 on the pilot. Accordingly, as the obturator moves upwardly, the fluid pressure in the upper fluid chamber 84 of the valve gradually increases until the fluid pressure forces across the obturator are again balanced upon the orifices 56, 58 returning to their neutral position of FIG. 3A with respect to the pilot. Actually, of course, the fluid pressure acting upwardly on the obturator when the valve is open may be slightly different than the upward pressure which acts on the obturator when the valve is closed. Accordingly, the equilibrium or neutral position assumed by the obturator with respect to the pilot when the valve is open may be slightly different than the neutral position of the obturator with respect to the pilot when the valve is closed.

It is evident from the foregoing description of the valve 20 that the valve obturator 36 constantly assumes an axial position in its cylinder 24 related to the angular position of the valve pilot 60. In actual practice, of course, some slight hunting movement of the obturator may occur. The metering pintle 42 on the obturator, in turn, is effective to meter fluid flow through the valve in relation to the axial position of the obturator. Thus, any desired metered flow of fluid through the valve may be obtained by appropriate positioning of the valve pilot 60. Flow through the valve may be cut off, of course, by returning the pilot to its position of FIG. 1.

It is evident from the foregoing description that the means for positioning the obturator valve face 44 with respect to the valve seat 32 is, in effect, a fluid operated servo mechanism or unit in which the obturator 36 comprises a differential servo piston, the pilot 60 comprises a servo input element, or pilot, and the metering pintle 42 comprises the driven or output member of the servo which is linearly displaced and positioned as a function of the angular displacement of the servo input element for pilot 60. Quite obviously, this servo mechanism is capable of other uses than effecting a valving function. For example, the valving structure could be replaced by a piston rod extending to the exterior of the servo body 22 for connection to an external device to be actuated. It is also quite obvious that the input displacement of the valve or servo pilot 60 could be axial or translational rather than rotational, as shown, in which case the valve obturator or servo piston 36 would be linearly displaced and positioned as a function of the linear input displacement of the pilot. Another possible modification of the servo or valve structure is operatively connecting the pilot 60 to the valve obturator or servo piston 36 for axial movement with the latter and placing the metering ports or orifices 56, 58 on the body structure. In this case the pilot would move axially with respect to the ports rather than vice versa, as in the disclosed valve. The pilot, of course, would still have to be capable of being controlled or displaced from the outside of the body 22.

Reference is now made to FIGS. 4 to 6 which illustrate different ways of ganging a series of the fluid metering valves 20 for synchronous actuation of the valve pilots 60 by a common actuator. In FIG. 4, a radial arm 100 is keyed to each valve pilot 60, externally of the respective valve body 22. The several arms 100, in turn, are pivotally connected to a common link or bar 102. One end of this bar is pivotally attached to an arm 104 keyed on the driven shaft 106 of a rotary actuator 108. Thus, the pilots 60 of the several metering valves 20 are simultaneously operable by the actuator 108. It is obvious that the several valve pilots may be identically oriented, so that the valves are opened and closed simultaneously by the actuator 108, for example. In the alternative, operation of the valves in predetermined phase relation or sequence may be achieved by appropriate relative angular orientation of their pilots 60.

In this latter connection, it will be observed that a highly important advantage of the present metering valve construction is that the angle of rotation of the valve pilot is not restricted. Accordingly, in the valve system of FIG. 4, the valve pilots may be located in any relative angular positions so long as the total valve actuator movement does not cause undesired reclosing or reopening of a valve.

In the valve system of FIG. 5, a series of the present metering valves 20 are ganged by meshing spur gears 200 keyed to the valve pilots 60 and to the shaft 202 of the rotary actuator 204. It is obvious that if the several valves are to be operated in the same phase relation with this system, the pilots of alternate valves must have opposite helical curvature to the pilots of the remaining valves because of the opposite directions of rotation of the pilots of the adjacent valves.

This problem is avoided in the multiple valve system of FIG. 6. In this latter system, a spur gear 300 is keyed to each valve pilot 60 and meshes with an idler gear 302 which, in turn, meshes with the gear 300 on the pilot of the adjacent valve. Keyed on the shaft 306 of the rotary actuator 308 for the valve system is a gear 310 which meshes with the adjacent idler 302. Thus, all of the valve pilots 60 are rotated in the same direction by the actuator. Other ways of ganging a series of the present metering valves may, of course, be devise.

It is evident that while the foregoing description has related to multiple valve systems, a series of the present servo units may be ganged for synchrouous control in precisely the same way. As a matter of fact, FIGS. 4 to 6 can be regarded as illustrating ganged servo units inasmuch as the valve pilots 60 actually comprise the pilots of the servo mechanisms.

Each of the disclosed valve systems may be used, for example, for controlling fluid flow from a single inlet fluid line $L_1$ to several outlet fluid lines $L_2$, one from each of the several system valves. The rotary actuators of the systems may be fluid operated through fluid lines $L_3$. Other types of actuators may be used, of course.

Clearly, then, the invention herein described and illustrated is fully capable of attaining the several objects and advantages set forth. Numerous modifications in the design, arrangement of parts, and instrumentalities of the invention are, of course, possible within its spirit and scope.

I claim:

1. A servomechanism comprising:
a pilot member;
a second member having a surface disposed in fluid sealing relation with the surface of said pilot member;
fluid pressure means including a fluid pressure chamber for effecting relative movement of said members in one direction along a direct line parallel to said surfaces;
means to exert force on said members for urging the latter in the opposite direction of relative movement thereof;
there being a fluid passage communicating a fluid inlet to a fluid outlet through ports in one of said surfaces and the other surface having means for progressively and simultaneously covering one port and uncovering the other port in response to relative movement of said members along said direction line and in such manner that the pressure in said chamber is decreased in response to relative movement of said members in said one direction and increased in response to relative movement of said members in said opposite direction; and
means for adjusting said pilot member to vary the effective area of said ports independently of the relative movement of said members.

2. A servomechanism comprising:
a pilot member;

a second member for cooperation with said pilot member;
one member having a bore movably receiving the other member with the sidewall surface of said bore confronting a surface of said other member;
fluid pressure means including a fluid pressure chamber for effecting relative movement of said members by the force of fluid pressure in said chamber;
means to exert a force on said members for urging the latter in the opposite direction of relative movement thereof;
one member having a fluid passage communicating a fluid inlet to a fluid outlet through ports in said surface of one member and the other member including means for progressively and simultaneously regulating the effective area of said ports in response to relative movement of said members; and
means for adjusting said pilot member to vary the effective area of said ports independently of the relative movement of said members.

3. A servomechanism comprising:
a pilot;
a member having therein a sidewall defining a bore slidably receiving said pilot;
fluid pressure means including a fluid pressure chamber communicating with said bore for effecting relative movement of said pilot and member in one direction by the force of fluid pressure in said chamber;
means to exert a force on said pilot and member for urging the same in the opposite direction of relative movement thereof;
there being a fluid passage communicating a fluid inlet to a fluid outlet through ports in the sidewall of said bore and said pilot including means for progressively and simultaneously regulating the relative effective areas of said ports in response to relative movement of said pilot and member and in such manner that the fluid pressure in said chamber is deceased in response to relative movement of said pilot and member in said one direction and increased response to relative movement of said pilot and member in said opposite direction; and
means for adjusting said pilot to vary the relative effective areas of said ports independently of the relative movement of said pilot and member.

4. a servomechanism comprising:
a pilot;
a member having therein a wall defining a bore slidably receiving said pilot;
fluid pressure means including a fluid pressure chamber communicating with said bore for effecting relative movement of said pilot and member in one axial direction to said bore;
means to exert a force on said pilot and member for urging the same in the opposite axial direction of said bore;
said member having a fluid passage communicating a fluid inlet to a fluid outlet through ports in the wall of said bore and said pilot having longitudinally and circumferentially extending edges for progressively and simultaneously covering one port and uncovering the other port in response to relative axial movement of said pilot and member and in such manner that the fluid pressure in said chamber is decreased in response to relative movement of said pilot and member in one axial direction of said bore and increased in response to relative movement of the pilot and member in the opposite axial direction of said bore; and
means for positioning said pilot with respect to said ports independently of the relative movement of said pilot and member.

5. A servomechanism comprising:
a pilot;
a member having a bore slidably receiving said pilot;
fluid pressure means including a fluid pressure chamber communicating with said bore for effecting relative movement of said pilot and member in one axial direction to said bore;
means to exert a force on said pilot and member for urging the same in the opposite axial direction of said bore;
said member having a fluid passage communicating a fluid inlet to a fluid outlet through ports in the sidewall of said bore;
said pilot having longitudinally extending and circumferentially inclined edges for progressively covering one port and uncovering the other port in response to relative axial movement of said pilot and member; and
means for positioning said pilot with respect to said ports independently of the relative movement of said pilot and member by said forces.

6. A servomechanism comprising:
a pilot;
a member having a bore slidably receiving said pilot;
fluid pressure means including a fluid pressure chamber communicating with said bore for effecting relative movement of said pilot and member in one axial direction to said bore;
means to exert a force on said pilot and member for urging the same in the opposite axial direction of said bore;
said member having a fluid passage communicating a fluid inlet to a fluid outlet through ports in the wall of said bore;
said pilot having longitudinally extending, helically curved edges for progressively covering one port and uncovering the other port in response to relative axial movement of said pilot and member; and
means for rotatably positioning said pilot with respect to said ports.

7. A servomechanism comprising:
a body having a fluid inlet, a fluid outlet and a fluid pressure chamber;
a movable pressure wall within said body having one side exposed to fluid pressure in said chamber for movement of said pressure wall in one direction under the force of said fluid pressure;
means to exert a force on said pressure wall for urging the latter in the opposite direction in said body;
a pilot movably carried on said body parallel to the direction line of movement of said pressure wall and slidably received in a bore defined by a sidewall in said pressure wall communicating with said chamber;
said pressure wall including a fluid passage communicating a fluid inlet to a fluid outlet through ports in the sidewall of said bore;
said pilot having a surface disposed in fluid sealing relation with the wall of said bore and terminating in longitudinally extending edges which progressively and simultaneously cover one port and uncover the other port in response to movement of said pressure wall; and
means for positioning said pilot with respect to said ports independently of relative movement of said pressure wall and said pilot along said direction line.

8. A servomechanism comprising:
a body having a fluid inlet, a fluid outlet and a fluid pressure chamber;
a movable pressure wall within said body having one side exposed to fluid pressure in said chamber for movement of said pressure wall in one direction under the force of said fluid pressure;
means to exert a force on said pressure wall for urging the latter in the opposite direction in said body;
a pilot rotatably carried on said body parallel to the direction line movement of said pressure wall and slidably received in a bore in said pressure wall communicating with said chamber;

said pressure wall including a fluid passage communicating a fluid inlet to a fluid outlet through ports in the wall of said bore;

said pilot having a surface disposed in fluid sealing relation with the wall of said bore and terminating in longitudinally extending circumferentially inclined edges which progressively cover one port and uncover the other port in response to movement of said pressure wall and in such manner that the fluid pressure in said chamber is decreased in response to movement of said pressure wall in said one direction and increased in response to movement of said pressure wall in said opposite direction; and means for rotatably positioning said pilot with respect to said ports.

9. A fluid pressure operated servo unit comprising:

a body member having a fluid inlet for connection to a fluid pressure source and an outlet;

a differential piston member movable in a cylinder in said body member and having a first transverse pressure face exposed to the pressure of fluid entering through said inlet, whereby said inlet pressure creates a force on said piston member in a direction to move the latter toward one end of said cylinder;

there being a fluid passage in one of said members communicating said inlet to said outlet and an axial defined by a wall bore in said one member intersecting said passage and communicating to said one end of said cylinder, said passage opening to said bore through ports in the wall of the bore;

a pilot carried on the other member and slidably received in said bore, whereby said ports and said pilot undergo relative movement in the axial direction of said bore during movement of said piston member in said cylinder;

said pilot having a sealing surface disposed in fluid sealing relation to the wall of said bore and terminating in helical edges which spiral in the same direction about said pilot so as to progressively cover one port and uncover the other port during relative axial movement of said pilot and ports whereby to vary the fluid pressure in said one end of said cylinder;

said piston member having a second transverse pressure face exposed to the fluid pressure in said one end of said cylinder and having a greater effective area than said first face, whereby fluid pressure in said one end of said cylinder creates a force on said piston member in a direction to move the latter away from the latter cylinder end;

said ports and pilot being so proportioned that the fluid pressure forces across said piston are balanced when given areas of said ports, respectively, are uncovered by said pilot; and means accessible externally of said body for moving said pilot to position said edges with respect to said ports independently of the movement of said piston member.

10. In a fluid pressure device, the combination comprising:

a first member;

a member having a bore slidably receiving said first member;

fluid pressure means including a fluid pressure chamber for effecting relative movement of said members in one axial direction of said bore; and means including a fluid passage communicating with said chamber through a port in the sidewall of said bore and maintaining a pressure in said chamber proportional to the effective area of said port, said first member including a longitudinally and circumferentially inclined edge for progressively covering and uncovering said port in response to relative axial movement of said members.

11. A valve comprising:

a body member having a first fluid passage and a fluid pressure chamber;

a movable pressure wall member in said body member having one side exposed to fluid pressure in said passage and its other side exposed to fluid pressure in said chamber, whereby fluid pressure in said chamber urges said wall member in one direction and fluid pressure in said passage urges said wall member in the opposite direction;

a pilot carried by one of said members and having a surface parallel to the direction line of movement of said wall member and disposed in fluid sealing relation to a surface on the other member, whereby said surfaces undergo relative movement along said direction line during relative movement of said members, there being a second fluid passage communicating a fluid inlet to a fluid outlet through ports in one of said surfaces and communicating to said chamber between said ports, and the other surface including means for progressively and simultaneously regulating the relative effective area of said ports in response to movement of said wall members;

means for adjusting said pilot to vary the relative effective area of said ports independently of relative movement of said wall member and said pilot along said direction line;

a valve seat about said first passage; and a valve obturator on said wall member engageable with said valve seat by movement of said wall member in said one direction.

12. A valve comprising:

a body member having a first fluid passage and a fluid pressure chamber;

a movable pressure wall member in said body member having one side exposed to fluid pressure in said passage and its other side exposed to fluid pressure in said chamber, whereby fluid pressure in said chamber urges said wall member in one direction and fluid pressure in said passage urges said wall member in the opposite direction;

a pilot carried on one member parallel to the direction line of movement of said wall member and slidably received in a bore in the other member communicating with said chamber, whereby said pilot and the sidewall of said bore undergo relative movement in the axial direction of said bore during movement of said wall member, there being a second fluid passage communicating a fluid inlet to a fluid outlet through ports in the wall of said bore and said pilot including means for progressively and simultaneously regulating the relative effective area of said ports in response to movement of said wall member;

means for adjusting said pilot to vary the relative effective area of said ports independently of relative movement of said wall member and said pilot along said direction line;

a valve seat about said first passage; and a valve obturator on said wall member engageable with said valve seat by movement of said wall member in said one direction.

13. A valve comprising:

a body having a fluid passage and a first fluid pressure chamber;

a movable pressure wall in said body having one side exposed to fluid pressure in said passage and its opposite side exposed to fluid pressure in said chamber, whereby fluid pressure in said chamber urges said wall in one direction and fluid pressure in said passage urges said wall in the opposite direction;

a pilot carried on said body parallel to the direction line of movement of said wall and slidably received in a bore in said wall communicating with said chamber, whereby said pilot and the wall of said bore undergo relative movement in the axial direction of said bore during movement of said pressure wall, said wall having a fluid passage communicating a fluid inlet to a fluid outlet through ports in the wall of said bore and said pilot having edges which progressively and simultaneously cover one port and uncover the other port in response to movement of said wall;

means for positioning said pilot with respect to said ports independently of the relative movement of said pressure wall and said pilot along said direction line;

a valve seat about said first passage; and a valve obturator on said pressure wall engageable with said valve seat by movement of said pressure wall in said one direction.

14. A valve comprising:

a body having a fluid passage and a first fluid pressure chamber;

a movable pressure wall in said body having one side exposed to fluid pressure in said passage and its opposite side exposed to fluid pressure in said chamber, whereby fluid pressure in said chamber urges said wall in one direction and fluid pressure in said passage urges said wall in the opposite direction;

a pilot carried on said body parallel to the direction line of movement of said wall and slidably received in a bore in said wall communicating with said chamber, whereby said pilot and the wall of said bore undergo relative movement in the axial direction of said bore during movement of said pressure wall, said wall having a fluid passage communicating a fluid inlet to a fluid outlet through ports in the wall of said bore and said pilot having longitudinally extending circumferentially inclined edges which progressively cover one port and uncover the other port in response to movement of said wall;

means for rotatably positioning said pilot with respect to said ports independently of the movement of said pressure wall;

a valve seat about said first passage; and a valve obturator on said pressure wall engageable with said valve seat by movement of said pressure wall in said one direction.

15. A valve comprising:

a body having a cylinder and a first fluid passage communicating a fluid inlet to a fluid outlet through one end of said cylinder;

a differential piston movable in said cylinder and having an axial bore opening to the other end of said cylinder;

there being a second fluid passage in said piston communicating said inlet to said outlet through ports in the wall of said bore;

a rotary pilot on said body slidably received in said bore and having edges for progressively covering one port and uncovering the other port in response to relative movement of said piston in said cylinder;

means for rotatably positioning said pilot with respect to said ports;

a valve seat about said first passage coaxial with said cylinder; and a valve obturator on said piston engageable with said valve seat.

References Cited by the Examiner
UNITED STATES PATENTS

| | | | |
|---|---|---|---|
| 269,148 | 12/1882 | Wise | 137—609 XR |
| 347,856 | 8/1886 | Wielding | 251—38 |
| 464,472 | 12/1891 | Butler | 137—609 XR |
| 979,532 | 12/1910 | Merrill | 137—609 |
| 3,090,396 | 5/1963 | Rudelick | 251—309 XR |

FOREIGN PATENTS

| | | |
|---|---|---|
| 1,126,735 | 7/1956 | France. |
| 241,913 | 12/1911 | Germany. |

WILLIAM F. O'DEA, Primary Examiner.